June 10, 1958 F. W. HORSTKOTTE 2,838,185
LOADING DEVICE
Filed May 4, 1956 4 Sheets-Sheet 2
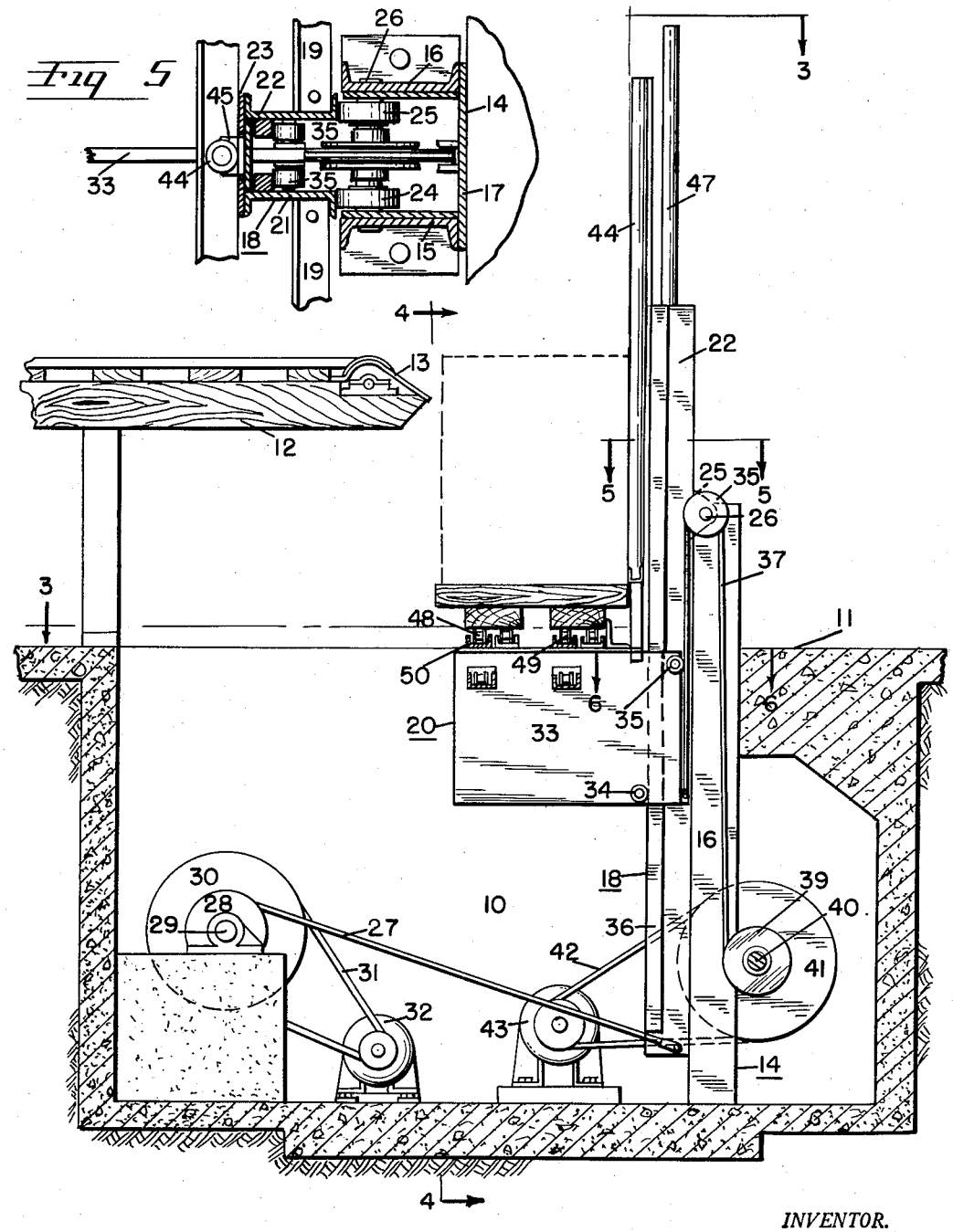
INVENTOR.
FREDERICK W. HORSTKOTTE
BY
ATTORNEY

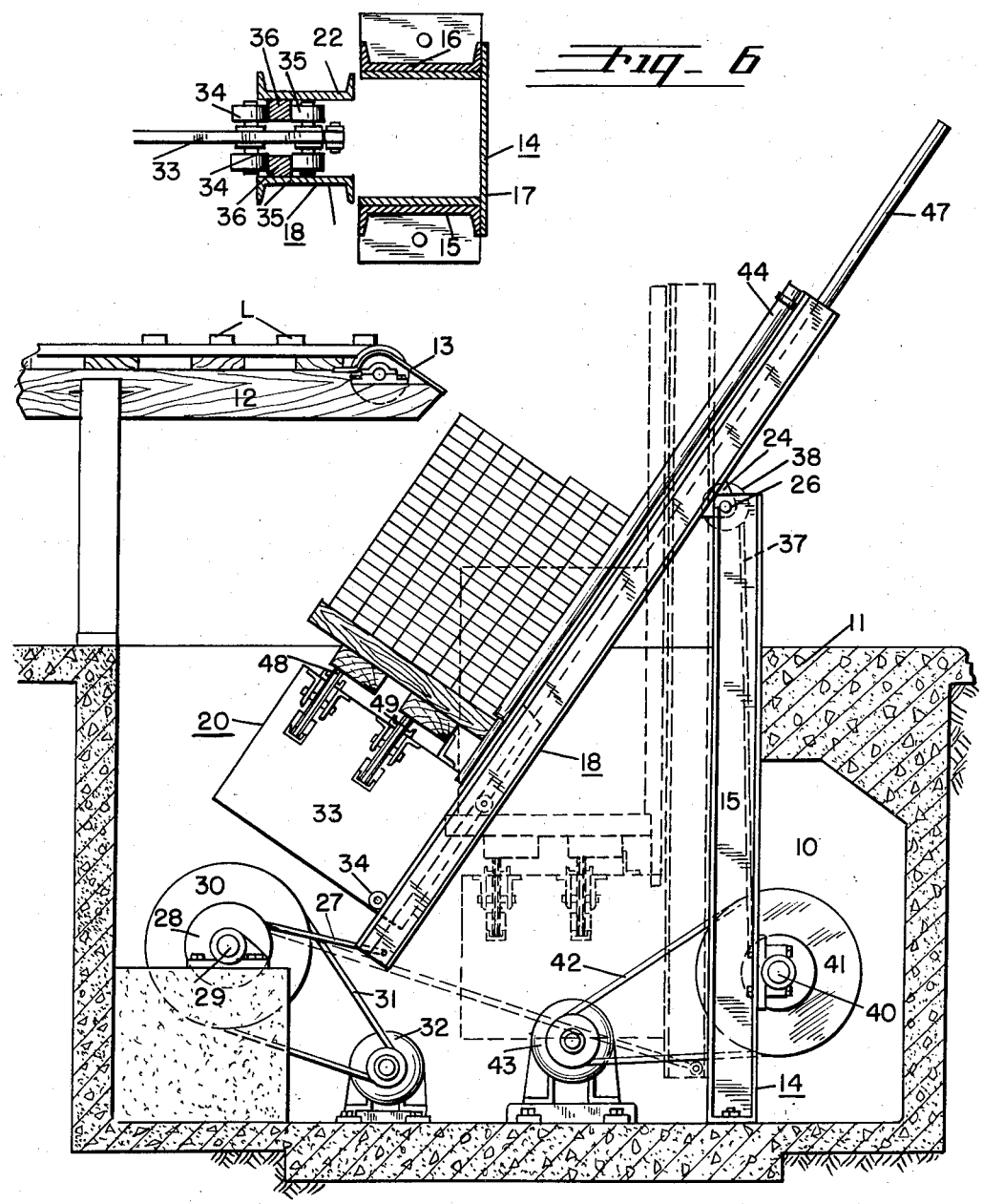

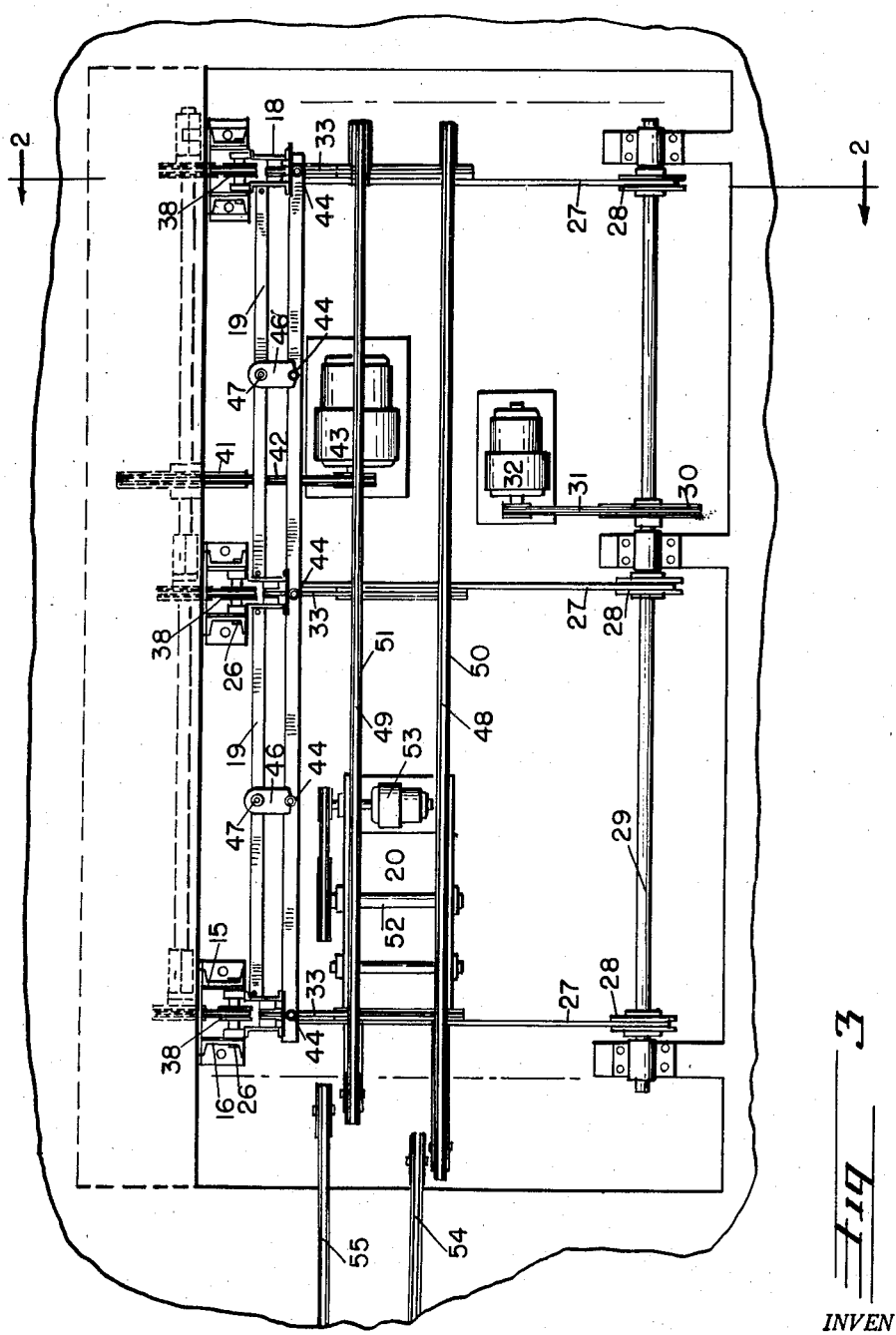

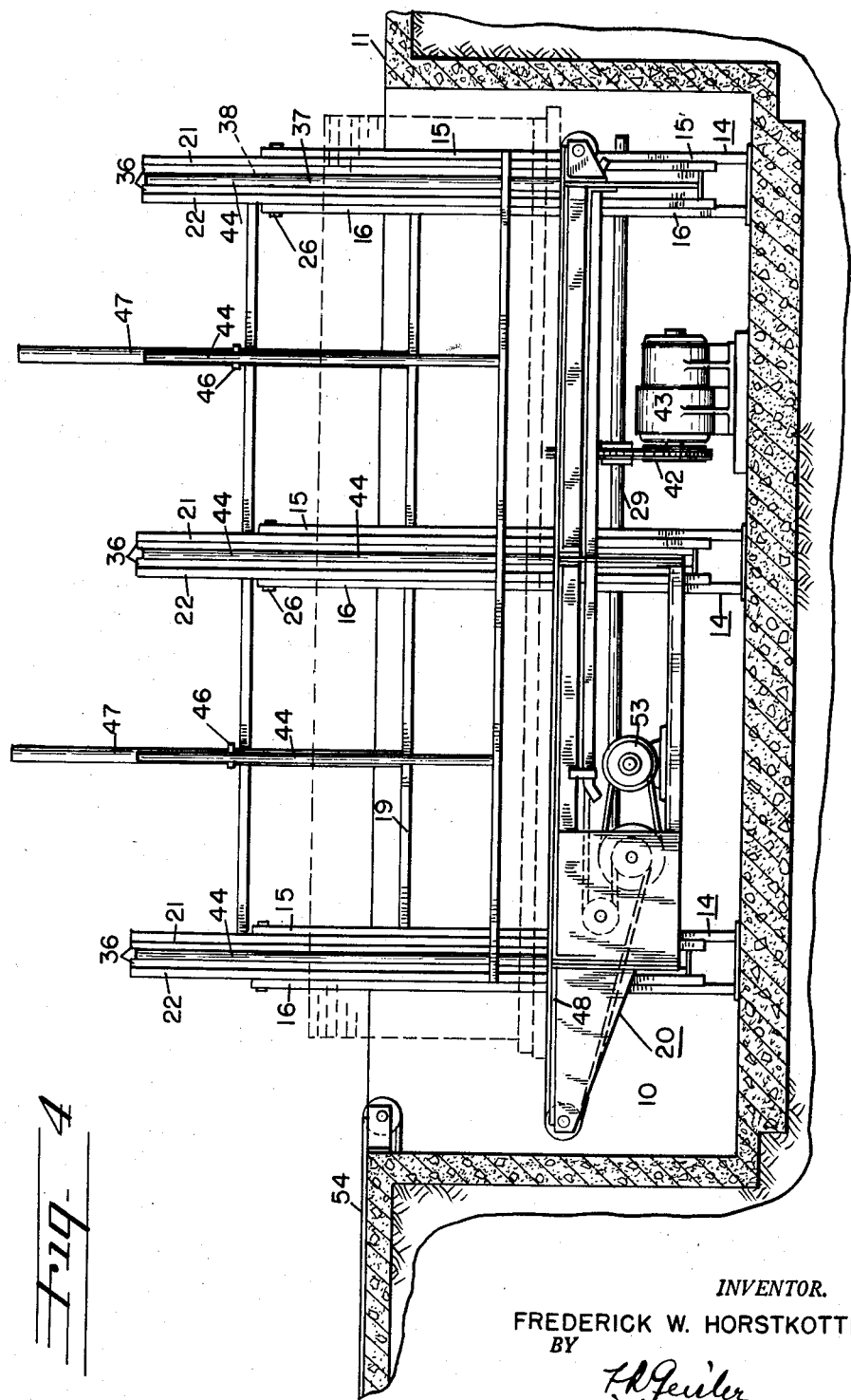

United States Patent Office 2,838,185
Patented June 10, 1958

2,838,185

LOADING DEVICE

Frederick W. Horstkotte, Portland, Oreg.

Application May 4, 1956, Serial No. 582,678

1 Claim. (Cl. 214—6)

This invention relates in general to means for stacking individual pieces of material of substantial length as they are delivered by a conveyor, and, more particularly, relates to means for stacking or loading lumber when the individual pieces or lengths of lumber, after leaving the planer, for example, are successively received from a transfer device such as endless chain conveyors. A device of this nature in lumber mills is commonly known as a "reloader" and the finished boards or pieces of lumber, returned individually from the planer, are stacked or reloaded onto some supportable and movable base so that the entire stack, as a unit, can be moved off of the reloader for removal by a lumber carrier, truck, or other lumber conveying vehicle.

A well known type of lumber "reloader" consists of a vertically movable platform positioned at the termination of an elevated endless conveyor or transfer means. The vertically movable platform itself is provided with transfer means, which, when the platform is returned to lower normal position, can be employed to move the pile of lumber, as a complete unit, off of the platform and generally in a direction at right angles to the direction at which the individual pieces of lumber were moved when they reached the platform, and from which the pile of lumber, as a unit, can be delivered onto some other conveying means. With such a device, known in the trade as a "Vertical Reloader," the platform is first raised to approximate height of the terminus of the first transfer means, after which the platform is lowered gradually as each tier or layer of lumber is completed, until the desired pile has been accumulated on the platform. In such procedure, however, and thus with the employment of a "Vertical Reloader" or device of this type, the individual pieces of lumber, as they reach the termination of the elevated transfer conveying them to the platform, must be manually placed in position on the platform and pile.

In order to avoid the manual labor necessary in the setting of each piece of lumber in place on the "Vertical Reloader," another somewhat similar loading device has been developed in which the platform, onto which the desired lumber pieces are to be loaded, is tilted at a fixed angle, and the platform is raised or lowered while remaining at this angle until the loading of the platform is completed, whereupon the platform, having been lowered to the main floor level, is temporarily moved into horizontal position so as to permit the pile of lumber to be carried off from the platform. The maintaining of the platform at a tilted fixed angular position during the loading operation enables the individual pieces of lumber, as they reach the end of the elevated transfer, to slide laterally onto the platform or onto the pile of lumber by gravity, sliding into place until they come to rest against suitable stops on the far side of the platform or against the side of the previously loaded piece of lumber. As one tier is completed, the platform, in the same fixed angle or sloping position, is then lowered approximately the thickness of the lumber pieces which form the tier.

The difficulty with the devices of this latter type, in which the platform, while being loaded, is maintained at a fixed angle from the horizontal, is that certain types of finished lumber, as they are slid rapidly into contact with each other, will interlock, as in the case of tongue and grooved boards and boards of the shiplap variety. Then, under the weight of superimposed tiers of lumber in the pile and with the moving of the pile as a unit, the interlocked tongues of some of the boards will break off. Furthermore, in such a device, since the angle at which the platform is tilted remains fixed during the loading operation, the loading of boards of random width with some spacing between adjacent lateral edges of the boards in a tier, which may be necessary in order to have the side edges of the tier in registration with the corresponding sides of other tiers of the load, is impossible. Also, if the slope of the reloader is too steep, the corners of rectangular boards are often damaged by contacting the projecting corners of the tier of boards below, since all boards do not lie entirely flat after surfacing.

An additional object to such device, with the platform maintained at a fixed angle with the horizontal, is that the end of the transfer or endless chain conveyor means, by which the individual boards are conveyed to the loading platform, must be positioned considerably higher above the main floor than in the case of a "Vertical Reloader," since the tilted platform with the completed lumber pile thereon must be brought to horizontal position beneath the terminus of the transfer means, and this requires the terminus of the transfer means to be considerably higher than the top of the load to enable the loaded platform to assume horizontal position at the floor level beneath the transfer.

An object of the present invention is to provide an improved loading device, designed particularly to serve as a "lumber reloader," in which the loading platform can be made to assume either a horizontal or an angular position at any time during the loading operation, as desired, and in which the angularity of the platform can be modified for any tier, at the will of the operator, so that the loader will be capable of assuming the most suitable position for the condition momentarily prevailing.

Another object of the invention is to provide an improved adjustable loading device, of the type above indicated, which can be served by a transfer means, the terminus of which need be located only a few feet above floor level and which, therefore, can be arranged parallel to the floor level, eliminating any wasting of space along the transfer and permitting space to be reserved along the transfer to take care of an additional sorting or grading operation of lumber pieces on the transfer.

The manner in which these objects and other incidental advantages are attained with my improved loading device and the manner in which the same is constructed and employed, specifically in the "reloading" of lumber, will be briefly described and explained with reference to the accompanying drawings.

In the drawings:

Figure 1 is an end elevation showing the device in the process of being loaded with the platform held at a position of desired angularity with the horizontal;

Figure 2 is a sectional elevation on line 2—2 of Figure 3 showing the device completely loaded with the platform in horizontal position in preparation for the moving of the load, as a unit, from the platform;

Figure 3 is a plan section taken on line 3—3 of Figure 2;

Figure 4 is a sectional elevation corresponding to line 4—4 of Figure 2, but showing the loading platform lowered below the floor line and thus below the position shown in Figure 2;

Figure 5 is an enlarged fragmentary plan section taken on line 5—5 of Figure 2; and Figure 6 is a fragmentary enlarged plan section taken on line 6—6 of Figure 2.

Referring first to Figures 1 and 2, a pit 10 is provided below the main floor level 11 to accommodate some of the operating mechanism and to permit the loading platform to be temporarily lowered below the floor level in the manner and for the reason later explained.

A transfer assembly 12 is mounted on suitable supports above the floor, preferably, although not necessarily horizontal, with its discharge end preferably at approximately the same height from the floor as the top of a conventional lumber load. The transfer assembly 12 is provided with a plurality of endless belts or chain conveyors so that the pieces of lumber, indicated at L in Figure 1, when deposited on the conveyor belts or chains will be moved laterally from left to right, as viewed in Figure 1, until they drop off from the end of the conveyor belts and slide down the short metal tracks 13 and thence onto the loading platform.

A plurality of stationary vertical, laterally spaced columns 14 (there being 3 in the device as illustrated see also Figure 4), are anchored in the pit 10, as shown in Figure 1. These terminate above the floor level between the floor level and the height at which the discharging end of the transfer assembly 12 is located, as shown in Figures 1 and 2. These columns 14 are each formed by a pair of spaced and oppositely positioned channel irons 15 and 16 which are joined on one side by a suitable web 17 so as to form a rigid hollow column structure.

An elevator guide frame 18 (Figures 1 and 2), consisting of a plurality of guideways, corresponding to the number of stationary columns 14, which guideways are connected by horizontal members 19 (Figure 3), is pivotally supported on the columns 14. Each of these guideways includes a pair of spaced channel members 21 and 22 (Figures 5 and 6) connected at top and bottom by web plates 23, one of which is shown in Figure 5. Hinge brackets 24 and 25 (Figures 1 and 5) are secured to the members 21 and 22 respectively of each of the guideways and are pivoted on stub shafts 26 mounted in the top ends of the stationary columns 14. Thus the entire elevator guide frame 18 may be tilted from the vertical position shown in full lines in Figure 2 and in broken lines in Figure 1 to an inclined position such as that shown in full lines in Figure 1.

Cables or chains 27 are attached at one end to the bottoms of the guideways of the guide frame 18 and the other ends of these cables or chains 27 are wound on pulleys 28 secured on a rotatable shaft 29. A drive sprocket 30, secured on the shaft 29, is connected by sprocket chain 31 to a gear operated by a reversible motor 32. A suitable control (not shown) is provided for the motor 32 and is located at some convenient point near the operator's station so that the operator, at any time it is desired, can cause the guide frame 18 to assume a suitable inclined position, as illustrated in Figure 1, or to return to a vertical position.

An elevator assembly, designated as a whole by the reference character 20, is movable up and down in the guide frame 18. This elevator assembly comprises a rigid frame structure formed with longitudinal and transverse members and includes vertical transverse plates 33 (one for each of the guideways on the guide frame 18). Each plate 33 of the elevator assembly carries a pair of guide rollers 34 and 35 (Figures 1, 2 and 6) mounted on each side of the plate and adapted to roll along opposite edges of the pair of tracks 36 secured on the inside faces of the members 21 and 22. A chain or cable 37 attached to each of the plates 33 passes over a pulley 38 mounted on the stub shaft 26 at the top of each of the stationary columns 14. The chain then passes down in the stationary column and is attached to a pulley 39 (Figure 2) secured to a rotatable shaft 40. A driving sprocket 41 on the shaft 40 causes rotation of the shaft 40, and therewith rotation of the pulleys 39, in unison, the driving sprocket 41 being connected by sprocket chain 42 to a suitable gear operated by a reversible motor 43. Control for this motor 43 (not shown) is also positioned at a location convenient to the operator, and thus the operator can raise or lower the assembly as desired in addition to changing the tilt of the guide frame 18 on which the elevator assembly rides.

The elevator assembly carries a plurality of upright rest bars 44 (there being five such rest bars in the device illustrated), which are rigidly secured at their lower ends to the elevator assembly and against which the first board of each tier of the lumber load will rest in the loading of the individual lumber pieces onto the device. As the elevator assembly moves up or down those of the rest bars 44 which are located adjacent the guide ways 18, respectively, slide in supporting brackets 45 (Figure 5) mounted at the top of the guide ways 18. The other rest bars 44 slide in supporting brackets 46 (Figure 3) which, in turn, are carried on stationary uprights 47 rigidly secured on the guide frame 18.

A pair of endless conveyor chains 48 and 49 are carried on the elevator assembly. In their upper course these conveyor chains move along on a pair of tracks 50 and 51 (Figures 2 and 3). These chains are driven in unison through the intermediary of a pair of drive sprockets secured on a shaft 52 (Figure 3) which shaft, in turn, is driven by suitable connection with a motor 53, this motor being mounted in the bottom portion of the elevator assembly. A suitable remote control (not shown) for the motor 53 is also located at some point convenient to the operator so that the operator, by setting the endless conveyor chains 48 and 49 in motion, can cause a load resting on these chains to be moved longitudinally off of the elevator assembly.

At one end of the elevator assembly, when the elevator assembly has been returned to horizontal position with the conveyor chains 48 and 49 preferably at floor level, as illustrated in Figure 2, the conveyor chains 48 and 49 terminate, at one end of their course, adjacent a pair of similar conveyor transfer chains 54 and 55, respectively (Figure 3), extending also preferably at floor level and leading off from the elevator.

In the loading of lumber onto the elevator the operator first prepares a platform or support with suitable bottom timbers and sets this in place on the chains 48 and 49 of the elevator. He then causes the guide frame 18 to be tilted to the desired inclination, depending upon the lumber to be loaded, and raises the elevator until these bottom support timbers are substantially in alignment with the tracks 13 (Figure 1) at the termination of the transfer 12. Then, as each tier is completed during the loading, the elevator is lowered a distance approximately equal to the thickness of one tier. If the elevator is tilted too much for the proper loading of the particular boards which are being loaded, such tilting can easily and quickly be modified by the operator as desired; and if one or more tiers of the load are to consist of boards requiring some lateral spacing and manual placing on the load, the operator in that case can have the tiers placed in horizontal position by adjusting the guide frame 18 to vertical position. When the elevator assembly has been loaded to the desired height, or when the desired number of tiers for the load have been completed, the guide frame 18 is adjusted so as to bring the loaded platform of the elevator into horizontal position and the elevator assembly is raised until the transfer chains 48 and 49 extend in the same horizontal plane with the transfer chains 54 and 55 and are in registration with, or adjacent to, the receiving ends of these latter chains.

Finally, the control for the motor 53 is actuated, causing the chains 48 and 49 to move in unison and to convey the load on the elevator to the transfer chains 54 and 55.

It will be noted from Figures 1 and 2 that, due to the fact that the entire guide frame for the elevator assembly can be tilted, and particularly due to the location of the tilting axis relative to the terminus of the transfer 12, the loaded elevator can be shifted from tilted to horizontal position and raised to load moving position even though the top of the load then extends above the height at which the terminus of the transfer 12 is located. This is a further important feature of the invention. Thus, with the present invention, the transfer means, by which the boards are conveyed to the device, can be located only a short distance above floor level, or even at the floor level, while at the same time the loaded pile of lumber can be moved off from the device at floor level.

In order to enable all these advantages to be attained it will be obvious that the tilting axis for the guide frame should be located in a vertical plane which is spaced beyond the terminus of the transfer 12 a distance not less than the width of the elevator and located at such height with respect to the height of the terminus of the transfer 12 that the elevator will move up and down within desired proximity of the terminus regardless of the position to which the guide frame is moved.

The advantages will be appreciated by anyone familiar with the "reloading" operations currently performed in lumber mills. Considerable saving of space in the mill is accomplished by having the transfer, by which the boards are conveyed to the "reloader," located parallel to and a short distance above the floor level. With such arrangement the operator can be stationed at floor level if he is working at the side of the stack opposite the oncoming lumber. If he is working at the even end of the stack, he can be staioned on a fixed platform located at a convenient height below the top of the stack if the load is removed from the reloader in the direction which he is facing. If the stack moves toward him, when the stack is removed from the reloader, this platform is made removable.

Various modifications could, of course, be made in the structure of the elevator assembly and adjustable guide frame within the scope of my invention and without departing from the principle of the invention. It is not my intention to limit the invention to the exact structure herein illustrated and described, or to restrict the invention otherwise except as provided for in the claim.

I claim:

A lumber loading device comprising a transfer conveyor having a terminus located above the floor, an elevator assembly located adjacent said transfer conveyor terminus, a guide frame for the elevator in said elevator assembly, a stationary support for said guide frame spaced beyond said conveyor terminus a distance equal approximately to the width of said elevator assembly, a hinge mounted at the top of said support, said guide frame mounted on said hinge, the axis of said hinge extending horizontally and extending normal to the direction of travel of said transfer conveyor, the horizontal plane of said hinge axis spaced below the horizontal plane of said conveyor terminus by a distance slightly less than the width of said elevator assembly, means for setting and maintaining said guide frame at any desired position on said hinge best suited for the loading of said elevator with the particular lumber being delivered by said transfer conveyor, means for moving said elevator up and down in said guide frame while said guide frame is maintained in a desired position, said elevator assembly, guide frame and hinge axis so arranged that said elevator can move up and down in desired close proximity to said conveyor terminus whether said guide frame is in vertical or tilted position, and means on the bottom of said elevator for moving a load off from said elevator in a direction normal to the direction of travel of said transfer conveyor.

References Cited in the file of this patent

UNITED STATES PATENTS

| | | |
|---|---|---|
| 1,128,671 | Evans | Feb. 16, 1915 |
| 2,613,824 | Tallman | Oct. 14, 1952 |
| 2,658,630 | Melin | Nov. 10, 1953 |
| 2,773,607 | Locke | Dec. 11, 1956 |